(12) United States Patent
Worley, III

(10) Patent No.: US 10,159,232 B2
(45) Date of Patent: *Dec. 25, 2018

(54) FISHING RELATED EVENT DETECTION

(71) Applicant: William Spencer Worley, III, Camano Island, WA (US)

(72) Inventor: William Spencer Worley, III, Camano Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,040

(22) Filed: Apr. 11, 2018

(65) Prior Publication Data

US 2018/0228136 A1    Aug. 16, 2018

Related U.S. Application Data

(63) Continuation of application No. 14/730,802, filed on Jun. 4, 2015, now Pat. No. 9,968,078.

(51) Int. Cl.
*A01K 87/00* (2006.01)
*A01K 97/12* (2006.01)
*H04L 29/08* (2006.01)

(52) U.S. Cl.
CPC .......... *A01K 87/007* (2013.01); *A01K 97/125* (2013.01); *H04L 67/12* (2013.01)

(58) Field of Classification Search
CPC ............................ A01K 87/007; A01K 97/125
See application file for complete search history.

(56) References Cited

U.S. PATENT DOCUMENTS

| | | |
|---|---|---|
| 4,930,243 A | 6/1990 | Lowe et al. |
| 5,195,267 A | 3/1993 | Daniels |
| 5,771,624 A | 6/1998 | Vickery et al. |
| 5,862,621 A | 1/1999 | Karppanen |
| 6,032,891 A | 3/2000 | Chang |
| 6,708,441 B2 | 3/2004 | Dirito |
| 7,040,052 B1 | 5/2006 | Paulk |
| 7,562,488 B1 | 7/2009 | Perkins et al. |
| 7,624,531 B2 | 12/2009 | Kirby |
| 7,779,573 B2 | 8/2010 | Pekin |
| 7,784,724 B2 | 8/2010 | Beckham |
| 7,934,338 B2 | 5/2011 | Hope |
| 8,336,248 B2 | 12/2012 | Miskatovic |
| 8,602,343 B2 | 12/2013 | Strohecker et al. |
| 9,609,856 B1 | 4/2017 | Little et al. |
| 2007/0006667 A1 | 1/2007 | Owens |
| 2009/0235572 A1 | 9/2009 | Pekin |
| 2011/0162465 A1 | 7/2011 | Pekin |
| 2011/0213570 A1 | 9/2011 | Rayor et al. |
| 2014/0358483 A1 | 12/2014 | da Rosa |
| 2015/0068102 A1 | 3/2015 | Britz |
| 2016/0219855 A1 | 8/2016 | Turner et al. |
| 2017/0086443 A1 | 3/2017 | Rogers |

*Primary Examiner* — Christopher P Ellis
(74) *Attorney, Agent, or Firm* — Athorus, PLLC

(57) ABSTRACT

Described is an apparatus and system for detecting fishing related events and providing notifications to a fisher regarding those events. When a fishing related event, such as a fish on line event occurs, it results in a fishing rod flexing or moving in particular directions. The described implementations include sensors located on or in the fishing rod that provide position data that is utilized to monitor a movement of the fishing rod and determine a type of fishing related event that has occurred.

20 Claims, 11 Drawing Sheets

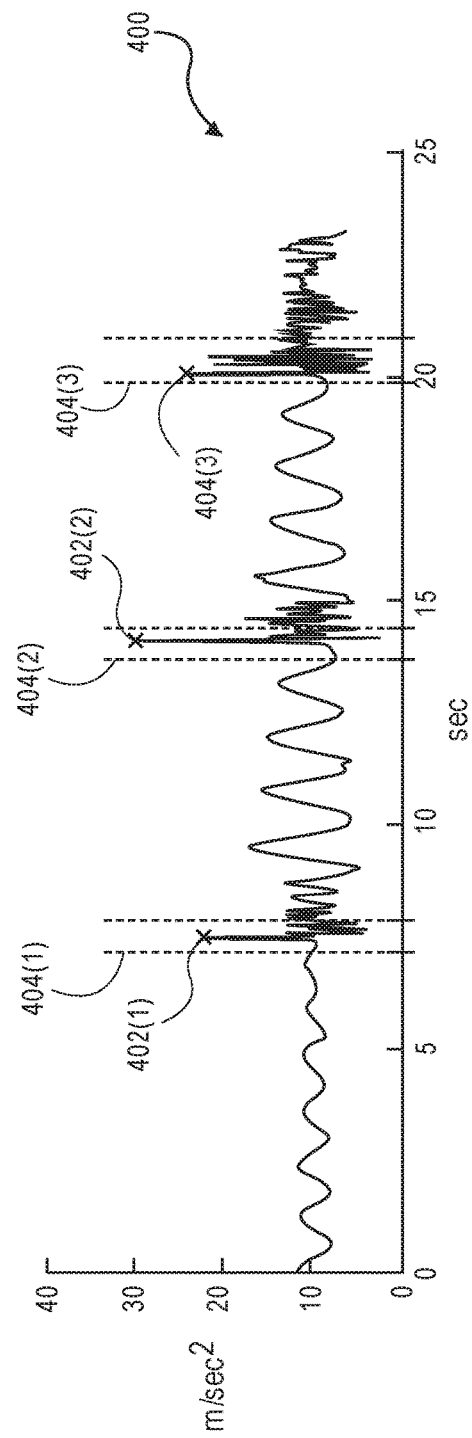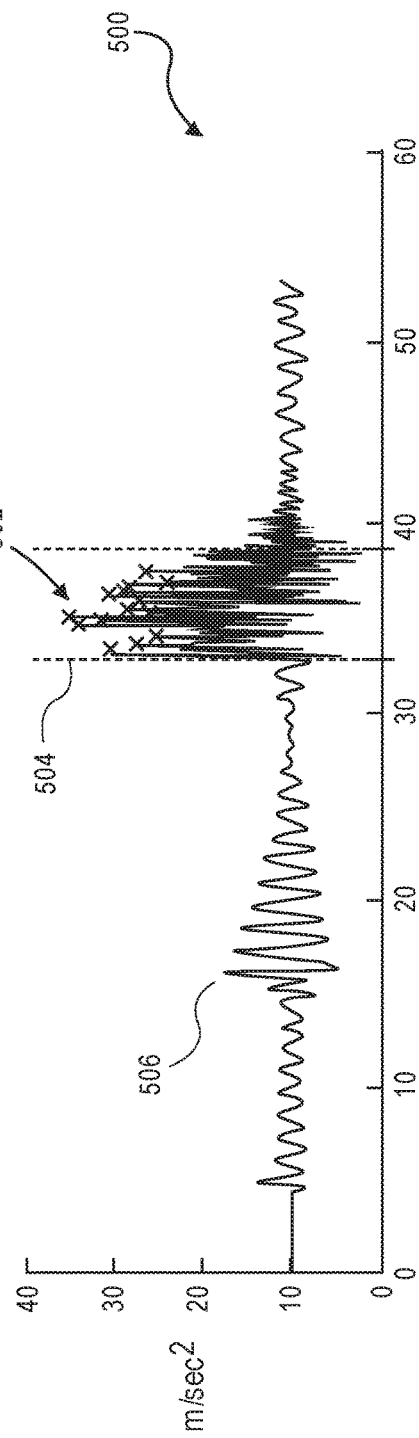

FISHING RELATED EVENT DETECTION

PRIORITY CLAIM

This application is a continuation of U.S. patent application Ser. No. 14/730,802, filed Jun. 4, 2015, the contents of which are incorporated by reference herein in their entirety.

BACKGROUND

There are many forms of fishing, some of which include a fishing rod and a terminal tackle. Even when using a fishing rod and terminal tackle there are many different forms and techniques for fishing. For example, some fishers may use spinning lures that are cast and reeled in to attract fish. In other examples, fishers may troll fish in which a terminal tackle is placed in the water and pulled with the movement of the boat on which the fishing rod is located. Regardless of the form of fishing, the odds of catching a fish are increased the longer the bait is in the water and properly available to the fish.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 is a diagram illustrating an event detection in a signal, according to an implementation.

FIG. 5 is a diagram illustrating an event detection in a signal, according to an implementation.

Figure 1:
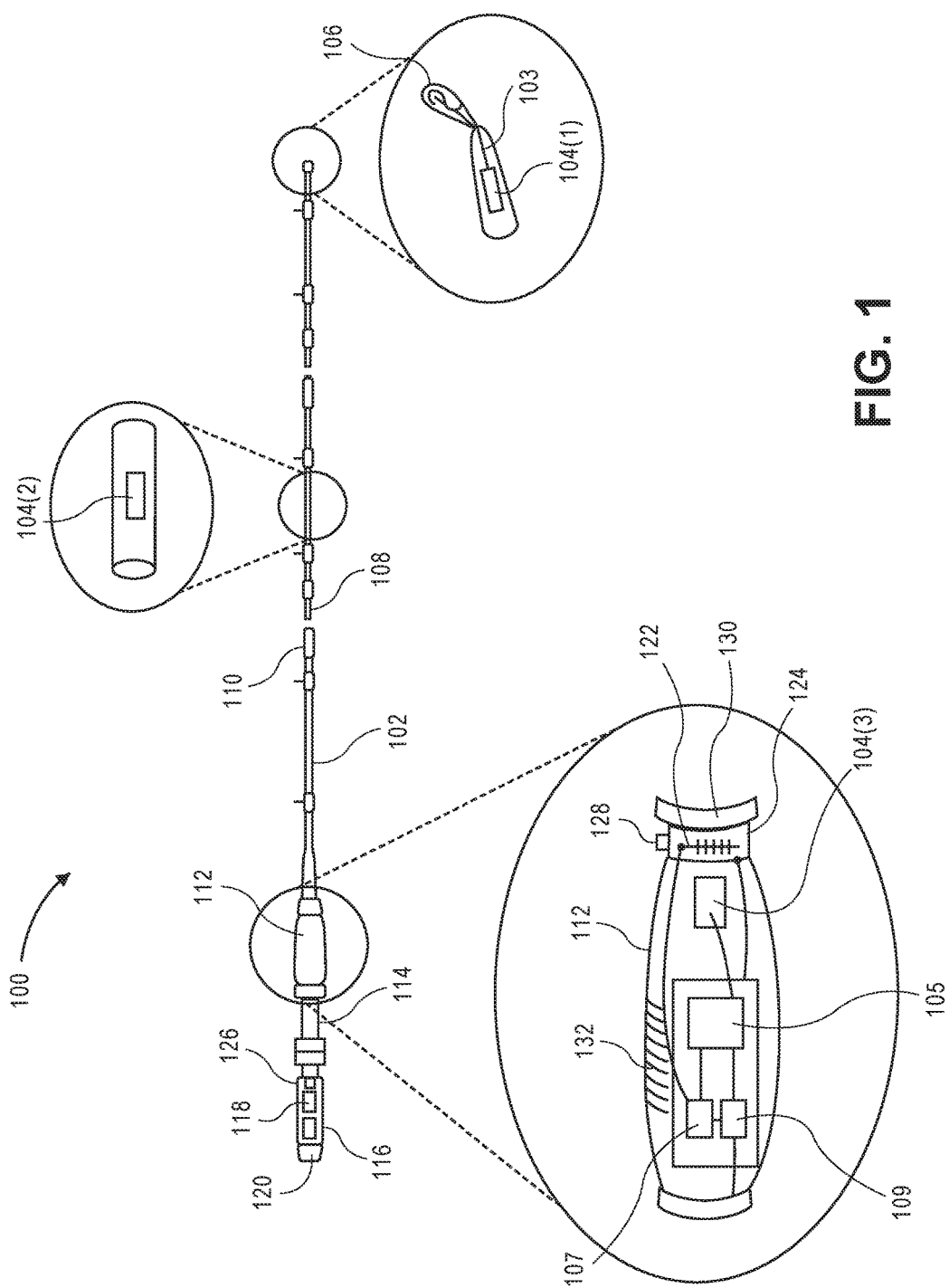
FIG. 1 is a diagram of a fishing rod, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described is an apparatus and system for detecting fishing related events and providing notifications to a user regarding those events. When a fishing related event, such as a fish on the line event occurs, it results in a fishing rod flexing or bending in particular directions. With the implementations described herein, movements of a fishing rod caused by fishing related events are detected and correlated with a representative pattern indicative of the fishing related event. For example, when a fish on the line event occurs, the fish typically begins to swim in different directions causing the flexible rod to not only flex in a vertical direction but also move laterally in response to the movement of the fish. By detecting the movements of the fishing rod with sensors located on the fishing rod, those movements can be converted into a signal indicative of the particular event. In comparison, if the terminal tackle becomes snagged or collects debris (an event), the flexible rod will flex in a vertical direction but will not move in a substantial side-to-side or lateral direction. As such, a signal indicative of debris being affixed to the terminal tackle can be detected and distinguished from other events, such as a fish on the line event.

In some implementations, as discussed below with respect to FIG. 1, a fishing rod may incorporate the sensors and computing components necessary to determine signals representative of fishing related events and notify a user of the fishing rod of those events. In other implementations, the sensors and/or computing system of the fishing rod may communicate with a client device that is used to process the data from the sensors on the fishing rod to detect an event represented by the received data and/or to receive event notifications from the fishing rod. Still further, in other implementations, the fishing rod and/or the client device may wirelessly communicate with one or more remote computing resources to provide fishing related information to those remote computing resources and/or receive stored event patterns and/or event filters representative of different fishing related events.

FIG. 1 is a diagram of a fishing rod 100, according to an implementation. The fishing rod 100 may be any type and/or brand of fishing rod. The fishing rod 100 includes a flexible rod 102 which may be a single unit flexible rod or separable into multiple different sections to facilitate storage and transport, as illustrated in FIG. 1. For example, the flexible rod 102 may be separable pieces that can be coupled and decoupled by inserting a male ferrule 108 into a female ferrule 110. The flexible rod may be formed of any flexible material, such as, but not limited to, graphite, carbon, fiberglass, etc. Typically, at least a portion of the flexible rod is hollow.

Regardless of the number of separable pieces of the flexible rod 102, when the flexible rod 102 is formed together there is a tip 106 end and a butt 120 end that is opposite the tip end. The fishing rod 100 also includes a handle 116, a reel seat 114, and a foregrip 112, all of which are closer to the butt 120 end than the tip 106 end.

Incorporated into or on the flexible rod 102 are at least two sensors 104. The sensors 104 may be any type of motion detection sensors capable of monitoring a motion of the sensor in at least three degrees (e.g., x, y, z), such as an accelerometer, gyroscope, etc. In one implementation, a first sensor 104(1) is positioned at or near the tip 106 of the flexible rod 102 and a second sensor 104(2) at or near the butt 120 of the flexible rod, and a third sensor 104(3) is positioned at a point along the length of the flexible rod 102 between the first sensor 104(1) and the second sensor 104(2). If the first sensor 104(1) cannot be positioned at the tip 106 of the flexible rod 102, for example, because the flexible rod 102 is too narrow at the tip, the flexible sensor 104(1) may be positioned a distance away from the flexible tip and a displacement wire 103 may extend from the first sensor 104(1) to the tip 106 of the flexible rod 102. The wire 103 may be used to detect motion at the tip 106 of the flexible rod 102.

The third sensor 104(3) may be positioned anywhere along the flexible rod between the tip 106 and the foregrip 112. In some implementations, the third sensor 104(3) is positioned at or near a flex point of the flexible rod 102. A "flex point," as discussed further below with respect to FIG. 2, refers to a position on the flexible rod that is at approximately fifty percent of the rod flex between the tip 106 end and the butt 120 end when the flexible rod is flexed by a loading weight affixed to the tip end of the flexible rod.

By positioning the third sensor 104(3) at or near the flex point of the flexible rod 102, when the tip 106 of the flexible rod 102 moves in a direction, the first sensor 104(1) is displaced with respect to the position of the second sensor, generating position and motion data from the sensors 104(2) and/or the third sensor 104(3) and the data collected by the first sensor 104(1) is different than the data collected by the second sensor 104(2) and/or the third sensor 104(3). The difference in the data collected between the first sensor 104(1), the second sensor 104(2), and/or the third sensor 104(3) may be monitored over a period of time and used to determine if a fishing related event has occurred. In other implementations, there may be fewer or additional sensors and the sensors, such as the first sensor 104(1), second sensor 104(2), and the third sensor 104(3) may be located at other positions along the flexible rod 102.

The sensors 104 may be positioned or placed at various locations on the flexible rod 102 and placement of a first sensor 104(1) at or near the tip 106 of the flexible rod 102, the second sensor 104(2) at or near the butt 120 of the flexible rod 102, and a third sensor 104(3) at or near a flex point of the flexible rod 102 are provided as examples only. In other implementations, the sensors may be positioned at other locations along the flexible rod 102.

Regardless of the sensor locations, the data obtained from the sensors are used to generate signals that convey information about the position and/or motion of the sensors with respect to a baseline sensor position and/or motion, and with respect to the position and/or motion of other sensors of the flexible rod 102. As discussed further below, the signals are processed and compared to event patterns and/or event filters to determine if an event has occurred. The event patterns and/or event filters utilize a combination of amplitude and/or frequency changes over a period of time to determine whether the signal generated for one or more of the sensors corresponds with the event represented by the event filter and/or event pattern.

When the sensors are activated, the sensors may provide initial position information that is used to establish initial positions of the sensors with respect to other sensors on the fishing rod 100. In some implementations, the distance between sensor mounting locations on the flexible rod 102 may also be known or provided to the processor 105 for use in determining a difference between positions of the sensors 104.

The first sensor 104(1), the second sensor 104(2), and/or the third sensor 104(3) communicate with and provide sensor data to a processor 105 that is incorporated into the foregrip 112, the handle 116, and/or other portion of the fishing rod 100. The processor 105 may receive the data from the sensors 104 and determine a difference in the data provided by the two sensors to determine if a fishing related event has occurred. For example, as discussed further below, if the difference between the data of the first sensor 104(1) and the data received from the second sensor 104(2) exceeds a difference threshold, it may be determined that a fishing related event has occurred. In another example, the magnitude of the data may be averaged to determine if an event has occurred.

In general, fishing related events may be determined based on signals that can be detected over a period of time by monitoring the difference between the first position and motion data from the first sensor 104(1) and the second position and motion data from the second sensor 104(2). For example, a memory 107, also located in the foregrip 112 of the fishing rod 100, may store fishing related event patterns and/or fishing related event filters that are known to be representative of different fishing related events. The processor 105, as it collects data from the sensors 104 located on the fishing rod 100, may process the sensor data to determine a signal representative of a difference between the data received from the sensors 104. The signal is then compared with stored fishing related event patterns and/or fishing related event filters to determine if the signal is representative of a fishing related event. If it is determined that a fishing related event has been detected, the processor 105 may generate a notification that is presented to a user of the fishing rod 100. For example, an illumination element (e.g., light) 130 located on an exterior position of the fishing rod 100 may be illuminated by the processor 105. Alternatively, or in addition thereto, the processor 105 may generate an event notification that is transmitted to a client device (not shown in FIG. 1) that is separate from the fishing rod 100.

The fishing rod 100 may also include a transmitter/receiver 109 in communication with the processor 105 that generates and sends a wireless event notification that includes event information (e.g., sensor data, a baseline signal, date, time) and a rod identifier to a client device using an antenna 122. The antenna 122 may be incorporated into or on the foregrip 112 of the fishing rod 100 and/or at other positions on the fishing rod 100. In some implementations, the antenna 122 may be incorporated inside the fishing rod 100 to provide weather protection for the antenna 122. In such an implementation, a portion of the fishing rod 100 may include a protective barrier 124 that allows transmission and receipt of wireless signals, such as a plastic protective barrier. The transmitted data, such as the sensor data, may be sent in a raw or original form. Alternatively, the transmitted data may be compressed using one or more compression algorithms prior to transmission.

The processor 105 may communicate with the sensors 104 via a wired and/or wireless connection. In some implementations, communication and/or power wires may be incorporated into the hollow portion of the flexible rod 102 that extend from the foregrip 112 to each of the sensors 104. In other implementations, the communication and/or power wires may be incorporated into the material that forms the flexible rod 102. For example, a flexible rod 102 may be formed in layers of material. During manufacturing of the flexible rod, the communication and/or power wires may be incorporated into and/or between one or more of the layers that are utilized to form the flexible rod 102.

In implementations in which the flexible rod 102 is separable at the male ferrule 108 and female ferrule 110, the power and/or communication wires may be coupled into the ferrules and the ferrules may enable connectivity when the rod is joined. For example, the male ferrule 108 and female ferrule 110 may be formed of a conductive material (e.g., brass, copper) such that, when the different portions of the flexible rod 102 are coupled together, the mating of the ferrules complete a wired connection between the processor and/or power source located toward a butt 120 end of the fishing rod 100 and one or more sensors 104. In another implementation, the wires that provide communication and/or power to and from the sensors 104 may be located on an external portion of the flexible rod 102.

The second sensor 104(2) of the fishing rod 100 may be positioned at a nonflexible portion of the fishing rod 100, such as the foregrip 112. In such an implementation, the second sensor 104(2) may be used as part of detecting an occurrence of a fishing related event and/or detecting a movement or repositioning of the fishing rod 100. For example, if the fishing rod 100 is placed in a rod holder for a portion of time while fishing, the second sensor 104(2) that is located on the nonflexible portion of the fishing rod 100 will remain substantially stationary, with respect to the rod holder. For example, if the rod holder is mounted to a fishing vessel that is located on water, the rod holder and the second sensor 104(2) of the fishing rod 100, when the fishing rod 100 is placed in the rod holder, will remain substantially stationary with respect to the movement of the fishing vessel on the water. In comparison, if the rod holder is mounted to a fixed surface (e.g., ground, fishing pier), the rod holder and the third sensor of the fishing rod 100, when the fishing rod 100 is placed in the rod holder, will remain substantially stationary with respect to the fixed surface.

When a user removes the fishing rod 100 from the rod holder, the second sensor 104(2) and/or third sensor 104(3) will detect a movement of the rod being removed from the rod holder and provide data representative of that movement to the processor 105. The processor 105, upon receiving data from the second sensor 104(2) and/or the third sensor 104(3) indicating that the rod is being moved or handled by a user, may provide that information to the client device and/or use that information to determine whether particular fishing related event notifications are to be generated in response to detected fishing related events.

Located in the handle 116 of the fishing rod 100 may be a power supply 118, such as one or more batteries. The power supply 118 provides power to the processor 105 and the sensors 104. Likewise, the handle may also include a power interface 126 that provides power from a source external to the fishing rod 100 to charge the power supply 118 and/or to provide power to the processor 105 and/or the sensors 104. For example, the power interface 126 may be contact based and, when the fishing rod 100 is placed into a rod holder (not shown), it may couple with a power interface located in the rod holder that then provides power through the power interface 126 to the fishing rod 100. The fishing rod 100 may also include an activation switch 128 that may be activated by a user to engage and power on/off the fishing related event detection system.

In some implementations, the fishing rod 100 may also include a proximity sensor 132, such as capacitive touch, Bluetooth, magnet, near field communication (NFC), etc., that is utilized to detect a presence of a user and/or when a user is holding or otherwise handling the fishing rod 100. As discussed below, when a fishing rod is in an actively held status (e.g., in the hands of a user), one or more detected fishing related events may be suppressed and not presented to the user.

Figure 2:
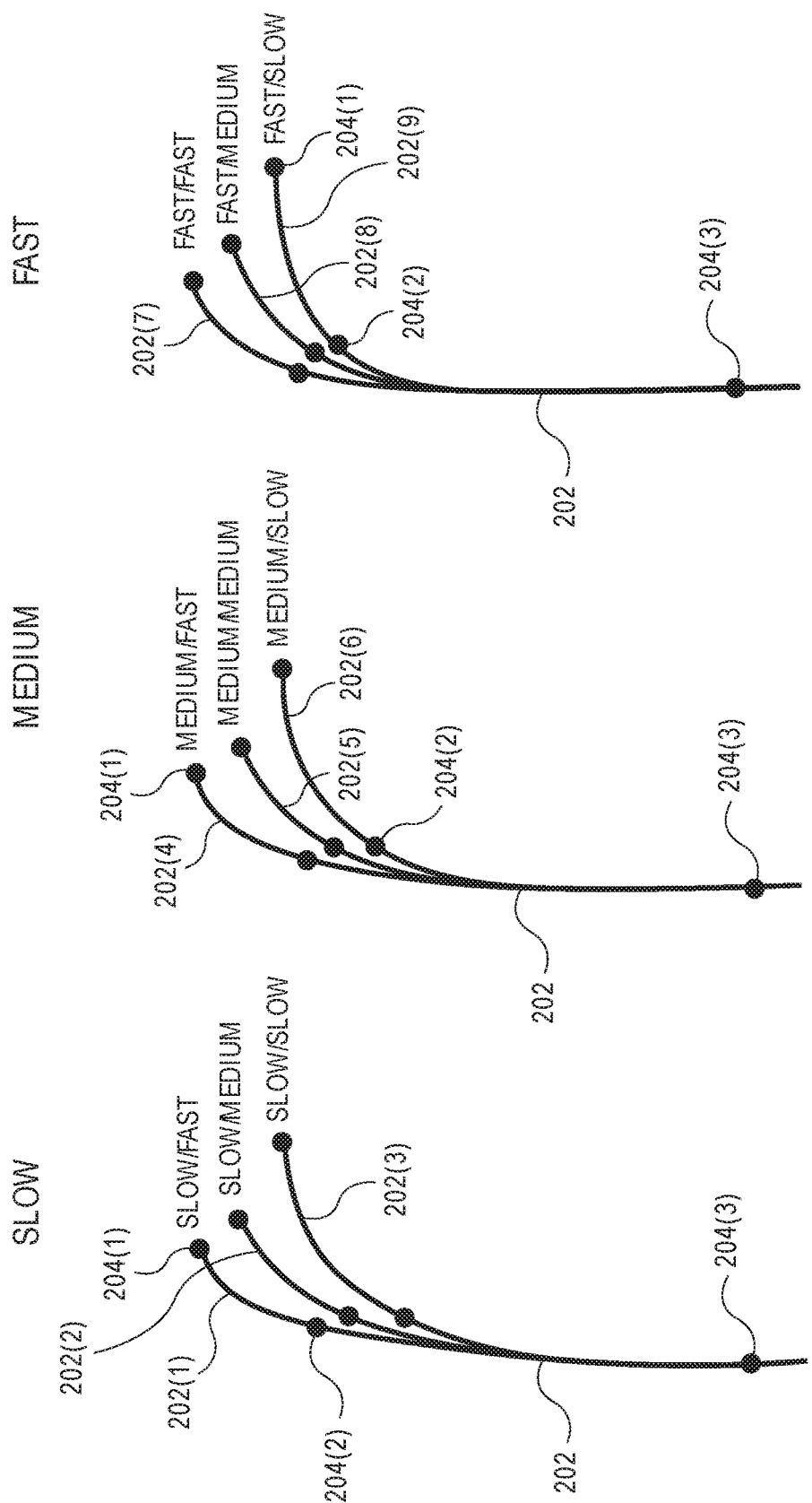
FIG. 2 is a diagram illustrating sensor placement on flexible rods with different actions, according to an implementation.

FIG. 2 is a diagram illustrating sensor 204 placement on flexible rods with different actions, according to an implementation. As is known, flexible rods 202 may generally be classified into different categories based on the action of the rod. For example, as illustrated in FIG. 2, flexible rods 202 may be classified in the categories of slow, medium or fast. Often, within those three different categories, the action of the rod may be further classified as slow, medium or fast. The action of a flexible rod 202 is a rating, which describes the amount of curvature that occurs in the flexible rod 202 in response to a loading weight. The faster the action, the further towards the tip the flexible rod 202 bends. This bend or curvature location of the rod is referred to herein as the "flex point." A "flex point," as used herein, refers to a position on the flexible rod that is at approximately fifty percent of the rod flex between the tip 106 end and the butt 120 end when the flexible rod is flexed by a loading weight affixed to the tip end of the flexible rod.

The slower the action, the flex point is more towards the middle of the flexible rod 202. For example, in the slow category, the flexible rod 202 is classified as having a slow/fast action 202(1) because the flex point of the flexible rod 202 is closer to the tip in comparison to the illustration of a slow/medium action 202(2) flexible rod or a slow/slow action 202(3) flexible rod. In each of the three sub-classifications within the slow category, the first sensor 204(1) is positioned at or near the tip of the flexible rod 202. In comparison, the third sensor 204(3) is positioned at different locations on the flexible rod 202 depending on where the flex point of the rod occurs. Likewise, in some implementations, a second sensor 204(2) may be positioned on a nonflexible or substantially rigid portion of the flexible rod 202.

Similar to the slow category, in the medium category, the flexible rod 202 may be sub-classified as medium/fast, medium/medium, or medium/slow depending upon the flex point position of the rod. The first sensor 204(1) is positioned at or near the tip of the flexible rod 202 but the third sensor 204(3) may be located at different points along the flexible rod 202. For example, the third sensor 204(3) is positioned closer towards the tip on the flexible rod having a medium/fast action 202(4) because the flex point is closer to the tip of the rod. In comparison, the third sensor 204(3) is further down the flexible rod having a medium/medium action 202(5) and the flexible rod having a medium/slow action 202(6).

Finally, in the fast category the action of the flexible rod 202 can be sub-classified as fast/fast, fast/medium, and fast/slow. Similar to the other categories, the first sensor 204(1) is positioned at or near the tip of the flexible rod 202 and the third sensor 204(3) is positioned along the flexible rod dependent upon the flex point of the flexible rod 202. For example, the third sensor 204(3) is positioned closer toward the tip of the rod that has a fast/fast action 202(7) in comparison to the position of the third sensor 204(3) for the rods that have a fast/medium action 202(8) and the rod that has the fast/slow action 202(9).

As illustrated in FIG. 2, the positioning of the sensors 204 may be dependent on the action or flexibility of the flexible rod 202 and the signals generated by the differences between the sensors when the rod is flexed in response to fishing related events. As such, the signals for different fishing related events may vary among rods depending on the action or flex caused by the rods. Likewise, while the above example describes placement of the third sensor at or near the flex point of the flexible rod 202, in other implementations, the third sensor may be placed at other locations on the flexible rod 202.

Figure 3:
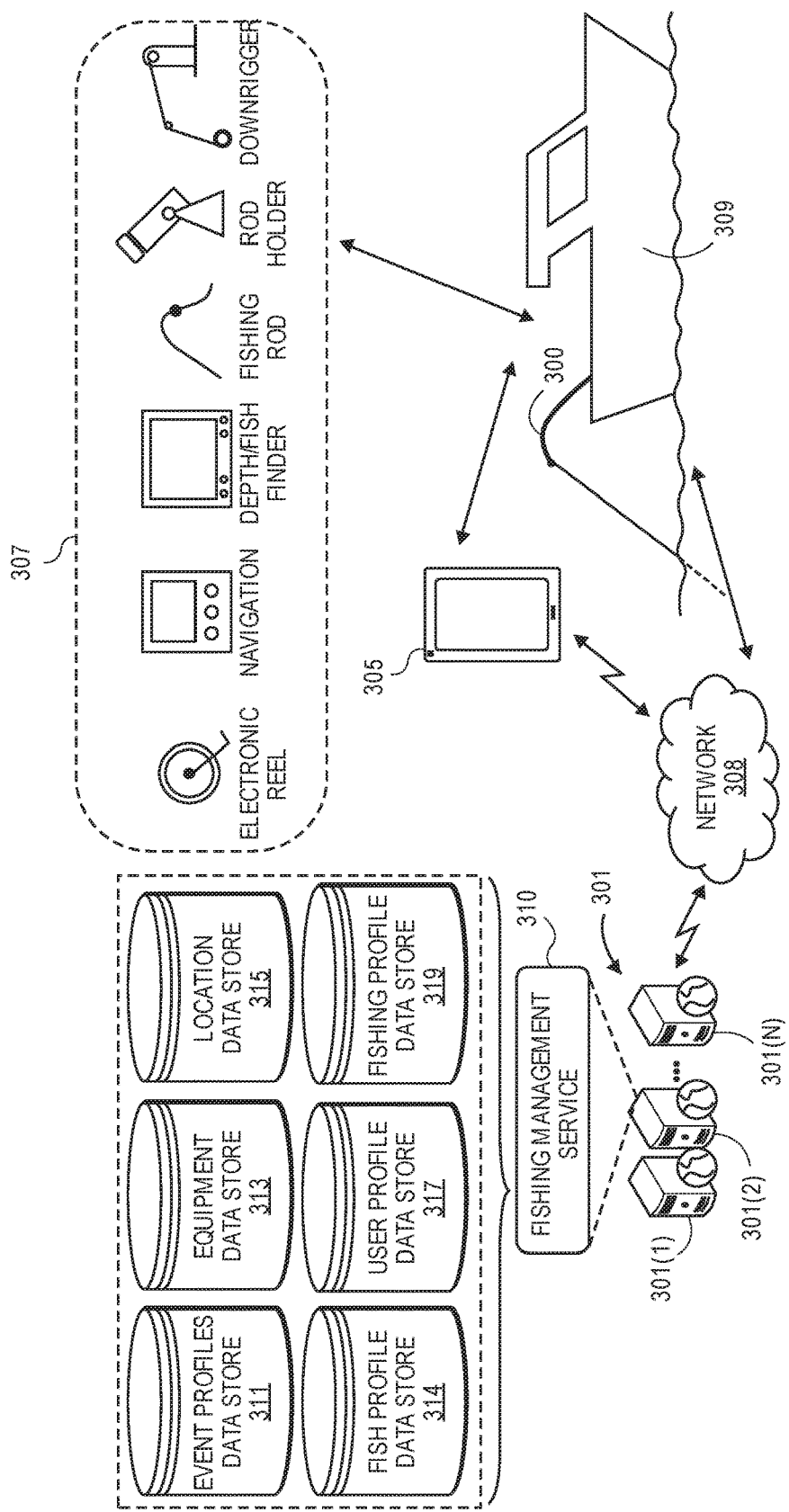
FIG. 3 is a block diagram of an environment for detecting a fishing related event, according to an implementation.

FIG. 3 is a block diagram of an environment for detecting a fishing related event, according to an implementation. The environment in this example includes a fishing vessel 309, such as a boat, upon which a fishing rod 300 is located. The fishing rod 300 corresponds to the fishing rod 100 discussed above with respect to FIG. 1. A user (not shown) is also located on the fishing vessel 309 and the user may operate or handle the fishing rod 300. In the example environment illustrated in FIG. 3, the user is trolling for fish (fishing profile).

The fishing profile may vary for different users (fishers), different fishing types, different locations, different times of year, different seasons, different fishing rods, different fishing reels, different terminal tackle, etc. In some implementations, the user may select the fishing profile. In other implementations, the fishing profile may be determined automatically based on, for example, the location of the fishing rod, the time of year, a baseline signal determined when the fishing event monitoring system of the fishing rod is activated, a user profile associated with the user and/or the fishing rod, etc.

The fishing rod 300 may communicate with a client device 305. The client device may be any type of client device, such as, but not limited to, a tablet, laptop, notebook, netbook, wearable computing device, cellular phone, etc. In some implementations, the client device may be part of and/or incorporated into the fishing vessel 309. The communication between the fishing rod and the client device may be wired and/or wireless. For example, when the fishing rod is placed in a rod holder, the communication between the fishing rod and the client device may be enabled through the fishing rod and the rod holder via a direct connection that enables communication exchange between the fishing rod 300 and the client device, via the rod holder. The connection between the fishing rod and the rod holder may also be utilized to provide power to the fishing rod. When a wireless connection is utilized, the wireless connection may be any form of wireless communication, whether direct or indirect. For example, a wireless communication may utilize Wi-Fi, Bluetooth, near field communication (NFC), etc., to facilitate data exchange between the client device and the fishing rod.

The client device 305 includes a processor, display, and memory, such as a non-transitory computer readable storage medium, among other components, and is configured to communicate with the fishing rod 300. An application or other computer executable instructions may be executed by the processor so that the client device 305 can operate as part of the fishing related event monitoring system. For example, the fishing rod may provide sensor data to the client device 305 and the client device 305 may process that sensor data to determine a signal. The client device may then compare that signal with stored fishing related event filters and/or fishing related event patterns that correspond to the selected or specified fishing profile to determine if an event has been detected. If it is determined that a fishing related event has been detected, the client device may generate an event notification that is presented to the user. Presentation of an event notification to a user is discussed further below with respect to FIG. 7

In addition to communication between the fishing rod 300 and the client device, the fishing rod 300 and/or the client device 305 may also communicate with one or more supporting device(s) 307. A supporting device is any device that may be used with fishing that is capable of communicating with the client device 305 and/or the fishing rod 300. For example, a supporting device 307 may be a reel that is included on the fishing rod 300, a navigation system of the fishing vessel 309, the motors of the fishing vessel 309, a rod holder in which the fishing rod 300 is placed, a depth/fish finder that is used to determine a depth of the water on which the fishing vessel 309 is located and/or a depth of fish within the water, a downrigger that is used with the fishing rod to position the terminal tackle, the terminal tackle, another fishing rod located on the fishing vessel 309, etc.

In implementations when multiple fishing rods are being utilized together (e.g., multiple fishing rods in use from the same fishing vessel), each additional rod may be considered a supporting device. Event notifications and/or signal data received or generated by the additional fishing rods may be utilized to determine and/or confirm a fishing related event. For example, if the fishing rod 300 and a second fishing rod both move from a baseline position to a similar position of the rod tip flexing downward at approximately the same time, the combined sensor data can be used to increase the likelihood that the event is a line hung or line snagged event rather than a fish on line event.

The supporting devices 307 may be configured to provide information to the client device 305 and/or the fishing rod 300 that may be processed and used to assist in event detection. Likewise, the supporting devices 307 may also receive fishing related event information from the client device 305 and/or the fishing rod 300 and perform one or more actions in response thereto. For example, a downrigger (supporting device) may receive a notification of an event, such as bouncing bottom event, or terminal tackle hung event, and retract the downrigger weight. As another example, if a snag or line hung event is detected, an event notification may be sent to the navigation system of the fishing vessel 309. The navigation system, in response to receiving the event notification, may slow or stop navigation to prevent the fishing line from breaking and the terminal tackle being lost.

In some implementations, the application operating on the client device 305 and/or the fishing rod 300 may be configured to communicate with one or more remote computing resources, which includes one or more server computers 301(1), 301(2)-301(N). As will be appreciated, any number and/or type of server systems 301, client devices 305 and/or supporting devices 307 may be included in the environment, and those illustrated in FIG. 3 are only exemplary. For example, there may be multiple fishers and corresponding fishing rods on the fishing vessel 309. Likewise, any number of users may be included in the environment.

The network 308 may include a local area network, a wide area network, such as a cellular network, a satellite network, a collection of networks, a public Internet protocol network, a private Internet protocol network, or a combination thereof. The server system 301 may also include an event profile data store 311, equipment data store 313, location data store 315, fish profile data store 314, user profile data store 317, and/or a fishing profile data store 319. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The event profile data store 311, equipment data store 313, fish profile data store 314, location data store 315, user profile data store 317, and/or a fishing profile data store 319 may be integrated with the server system 301 or otherwise communicatively coupled with the server system 301. For example, one or more of the event profile data store 311, equipment data store 313, fish profile data store 314, location data store 315, user profile data store 317, and/or a fishing profile data store 319 may be located at another remote computing resource and communicatively coupled with the server system 301. In some implementations, the event profile data store 311, equipment data store 313, fish profile data store 314, location data store 315, user profile data store 317, and/or a fishing profile data store 319 may include one or more CD-RW/DVD-RW drives, hard disk drives, tape drives, or other storage devices that are utilized to store digital content and information. The server system 301, separately or together with the event profile data store 311, equipment data store 313, fish profile data store 314, location data store 315, user profile data store 317, and/or a fishing profile data store 319, may provide a fishing management service 310 that facilitates the monitoring, detection and/or sharing of fishing related events.

The event profile data store 311 stores information corresponding to fishing related events. Fishing related events include any type of fishing events, such as fish on line event, a bait pulled event, a terminal tackle snagged event, a small fish on line event, a terminal tackle debris event, etc. For each event, the event profiles data store 311 maintains an event pattern and/or event filter indicative of fishing rod movement that occurs during those events. In some implementations, the event pattern and/or event filter may be specific to the event, the fishing rod, fishing reel, fishing line, location, type of fishing, user, etc. In other implementations, the fishing related event pattern and/or event filter may be indicative of the event, independent of user, fishing type, etc. In some implementations, the event patterns and/or event filters may be dynamically generated based on information in the fishing profile. For example, if the fishing profile indicates a particular type of flexible rod, reel, line weight, fishing depth, etc., that information may be utilized to generate event patterns and/or event filters relevant to the fishing profile.

The event patterns and/or event filters may be utilized when processing the data obtained from sensors of a fishing rod to determine if a fishing related event has occurred. Because different events have different signals, when data from the sensors is processed to determine a signal(s) representative of a motion of the fishing rod, the signals are compared with the stored event patterns and/or event filters to determine if an event has occurred. In some implementations, the detection of an event may be a multistep process. For example, the signal determined during a fishing activity may be compared to a baseline signal established for the fishing rod during the present fishing activity to determine if an event is potentially occurring. If it is determined that an event is potentially occurring, the determined signal may then be compared to stored event patterns and/or stored event filters for the type of fishing activity being performed. If the determined signal corresponds with a stored fishing related event pattern and/or stored event filter, an event type is determined. In some implementations, additional processing and comparison of signals determined from sensor data may be performed to obtain additional information related to a detected event. For example, in a fish on line event, the signals determined from the sensor data may be further processed during the occurrence of the event and compared with additional stored fish on line event patterns and/or event filters to determine a type of fish that is involved in the event.

The equipment data store 313 maintains information relating to equipment that may be utilized in a fishing activity that may cause an event signal to vary based on the equipment. For example, the equipment data store 313 may maintain information relating to rods, rod type, rod power, rod action, sensor positions, reels, terminal tackle, etc.

The fish profile data store 314 maintains information relating to different types of fish and how those fish respond in fishing related events. For example, the fish profile data store 314 may maintain information indicating the approximate weight range for different species of fish, how different species of fish typically behave when caught on a terminal tackle, a depth at which different species of fish are typically found to exist, and the like.

The location data store 315 maintains information corresponding to different areas where fishing events have occurred. As discussed below, as fishing events are detected, the fishing event information may be provided to the fishing management service 310 to update the user's profile, share with others, etc. Likewise, the fishing event information, which may include position and/or time of the event, may be stored in the location data store 315 and aggregated with other event information from other detected fishing related events. The aggregated information may be used to identify trouble areas for fishing, preferred trolling speeds when trolling for fish, preferred types of terminal tackle for different fish, locations, trolling speed, areas where fish are known to be located and/or caught at different times, temperatures, seasons, etc.

The user profile data store 317 maintains information related to users (e.g., fishers) of the fishing management service 310. The user profile may include fishing event history, fishing preferences, fishing locations, fishing equipment used, etc.

The fishing profile data store 319 includes different fishing profiles for different types of fishing—trolling, casting, fly fishing, etc. When a new user joins the fishing management service 310, the user may select a fishing profile from the fishing profile data store 319. The selected fishing profile(s) are associated with the user profile and, as the user fishes, the user profile and corresponding fishing profile are customized based on that user's particular fishing habits, equipment, etc.

FIG. 4 is a diagram illustrating an event detection in a signal 400, according to an implementation. In this example, the signal 400 is generated from a fishing rod that is being used to troll for fish (fishing profile). The sensor data obtained from the sensors on the rod are processed to generate the signal 400 which represents the motion of the rod over a period of time. The event detected in the signal 400 is a bouncing bottom event in which the terminal tackle is bouncing on the bottom surface. The bouncing bottom event pattern identifies a threshold and a number of times that the threshold is to be exceeded during a defined period of time.

The event is detected by comparing the signal 400 with the bouncing bottom event pattern. In this example, the amplitude of the signal 400 exceeds the threshold specified in the bouncing bottom event pattern at points 402(1), 402(2), and 402(3). Likewise, because the bouncing bottom event pattern specifies that a bouncing bottom event is occurring if the threshold is exceeded at least three times during a fifteen second period of time, it is determined that a bouncing bottom event has occurred.

FIG. 5 is another diagram illustrating an event detection in a signal 500, according to an implementation. In this example, the signal 500 is generated from a fishing rod that is being used to troll for fish (fishing profile). The sensor data obtained from the sensors on the rod are processed to generate the signal 500 which represents the motion of the rod over a period of time. The event detected in the signal 500 is a fish on line event. The fish on line event pattern identifies a threshold that must be crossed a number of times during a defined period of time for the event to be determined.

The event is detected by comparing the signal 500 with the fish on line event pattern. In this example, the amplitude of the signal 500 exceeds the threshold specified in the fish on line event pattern numerous times, as illustrated by each "X" 502 during the period of time 504. When the threshold is first exceeded, it is determined that an event may be occurring. When the number of times the threshold is exceeded corresponds to the number indicated in the fish on line event pattern during the defined period of time, it is determined that a fish on line event has occurred.

As can be seen by a comparison of the signals illustrated in FIG. 4 and FIG. 5, different patterns are representative of different types of fishing related events. As such, different fishing relates events can be determined from signals determined from sensor data obtained from sensors positioned on a fishing rod.

While the signals represented in FIG. 4 and FIG. 5 are illustrated as two dimensional signals, it will be appreciated that one or more of the sensors on a fishing rod may provide data in three dimensions (e.g., x, y, z) and that information may be processed to generate a three dimensional signal indicative of a motion of the fishing rod in three dimensions. Likewise, one or more of the fishing related event patterns or filters may specify threshold and/or frequency occurrences in any one or more of the three dimensions.

Figure 6:
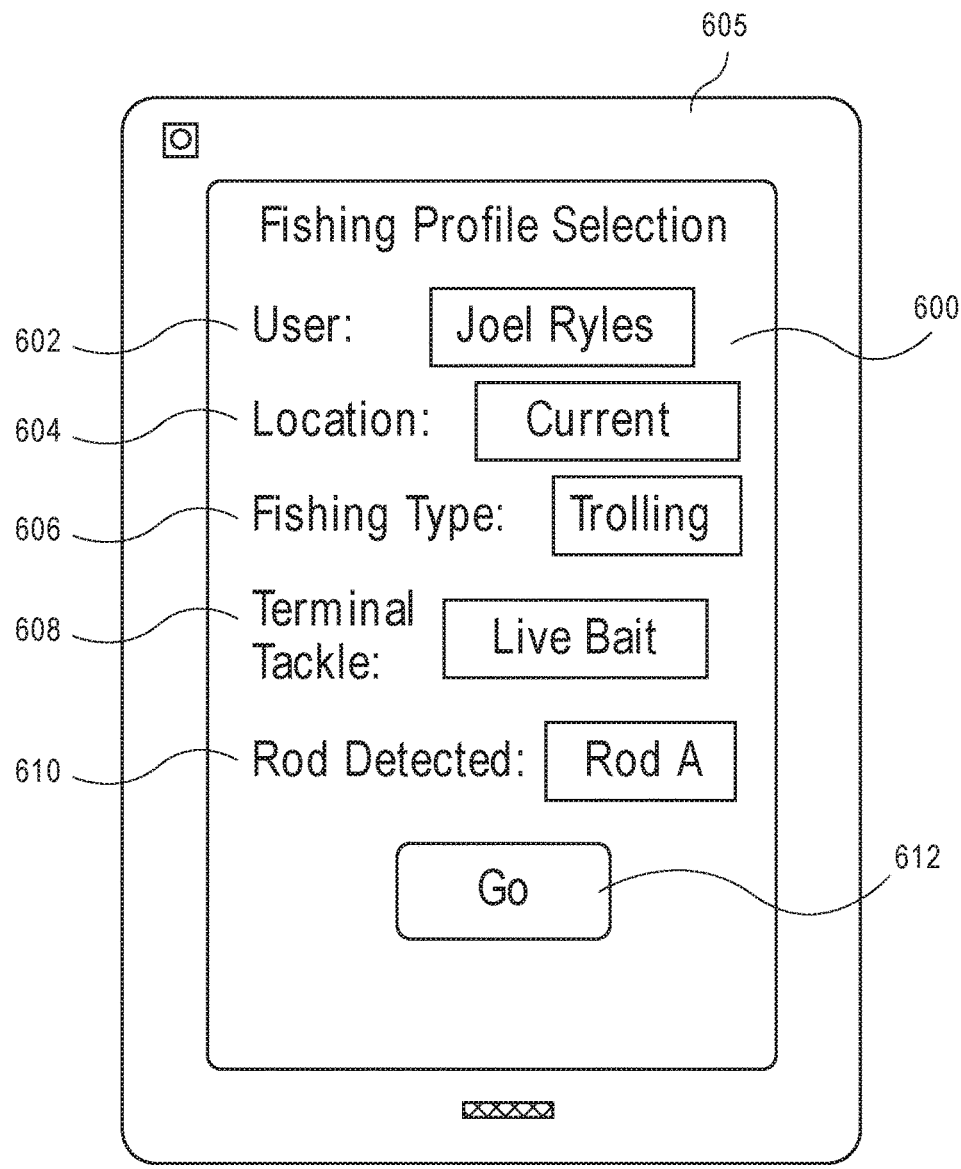
FIG. 6 is a representation of a user interface for selecting a fishing profile, according to an implementation.

FIG. 6 is a representation of a user interface 600 presented on a client device 605 for selecting a fishing profile, according to an implementation. Utilizing the user interface 600, a user name or user account 602 may be selected or input. In this example, the user name of "Joel Ryles" has been selected. Likewise, a location 604 for the fishing activity may be selected. A user may input a location, select from a list of locations, or select to use the current location, as illustrated. When selecting the current location, the client device 605 may determine the current location utilizing, for example, global positioning systems (GPS) information. A fishing type 606, such as trolling, casting, fly, etc., may likewise, be selected. The type of terminal tackle 608, such as bait, lure, spinner, jig, etc. may also be selected via the user interface 600. In addition, the user interface 600 may also present an indication of the fishing rod that has been detected for use with the selected fishing profile. In this example, the detected rod 610 is "Rod A." In instances when the user is utilizing more than one rod, the user may select the same or different fishing profiles for the different rods. Likewise, if multiple users are utilizing the same client device 605, each user may specify a corresponding fishing profile for that user.

For example, if the fishing management system is being used on a chartered fishing boat, there may be multiple users (fishers) and multiple fishing rods. Each user may be associated with one or more rods and each rod may be associated with one or more users. Likewise, in some implementations, the position of the rod on the fishing vessel may also be specified. For example, each rod may be associated with a particular position on the fishing vessel or with a particular rod holder. Such position information may aid in the identification of a rod for which a fishing related event has been detected.

Upon user selection of the different characteristics of the fishing profile, the user may select the "Go" control 612 to initiate fishing. Upon selection of the Go control, the application operating on the client device and/or the fishing management service determine events, and event patterns and/or event filters that correspond with the specified fishing profile. As discussed above, an event pattern and/or event filter for a fishing related event may be determined based on the fishing equipment, fishing type, user, etc. The event patterns and/or event filters are then provided or stored at the client device 605 and/or provided to and stored on the fishing rod for use in comparing with signals from the fishing rod sensors to determine whether a fishing related event has occurred.

Figure 7:
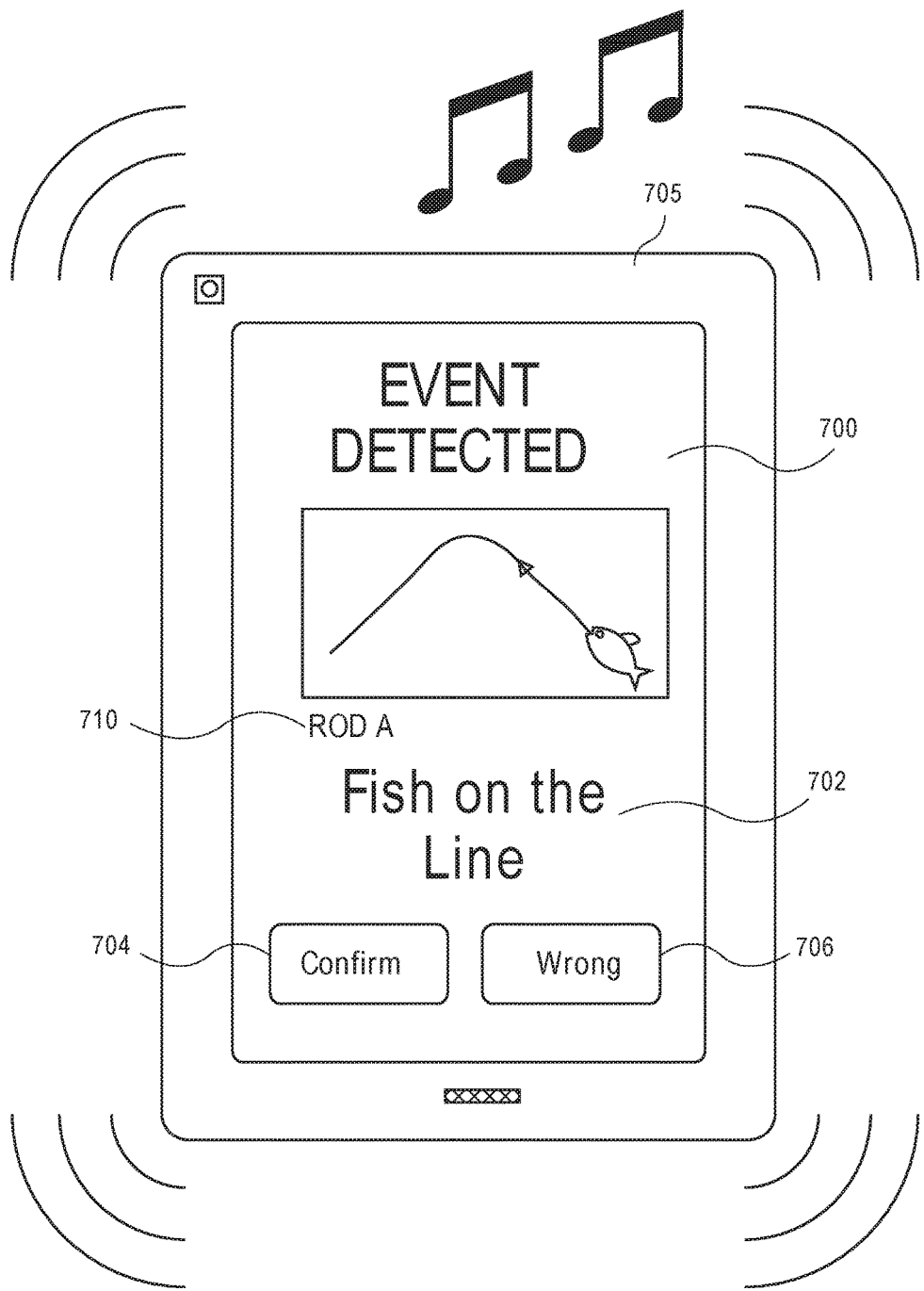
FIG. 7 is a representation of a fishing related event notification, according to an implementation.

FIG. 7 is a representation of a fishing related event notification 700 presented on a client device 705, according to an implementation. When an event is detected, such as a fish on line event 702, an event notification is presented to the user. In this example, the event notification includes a visual event notification 700 that is presented on a display of the client device 705, an audible notification that is presented from a speaker of the client device 705 and a physical notification in the form of vibrations that are generated by the client device 705. As will be appreciated, event notifications may be presented in one or more forms.

The event notification 700 may identify the type of event detected, "fish on line," the fishing rod 710 associated with the detected event, a request for confirmation 704 of the event and/or a request for correction 706 of the event. If the user selects the "Confirm" 704 control, the user is providing explicit feedback that the detected event has actually occurred. Such feedback and the event signal detected may be associated with the user and the event type. Likewise, if the user selects the "Wrong" 706 control, the user may be asked to identify the event that actually occurred. If the user provides an indication of the event that actually occurred, the provided event type and the determined signal may be associated with the user and/or the event type.

Figure 8A:
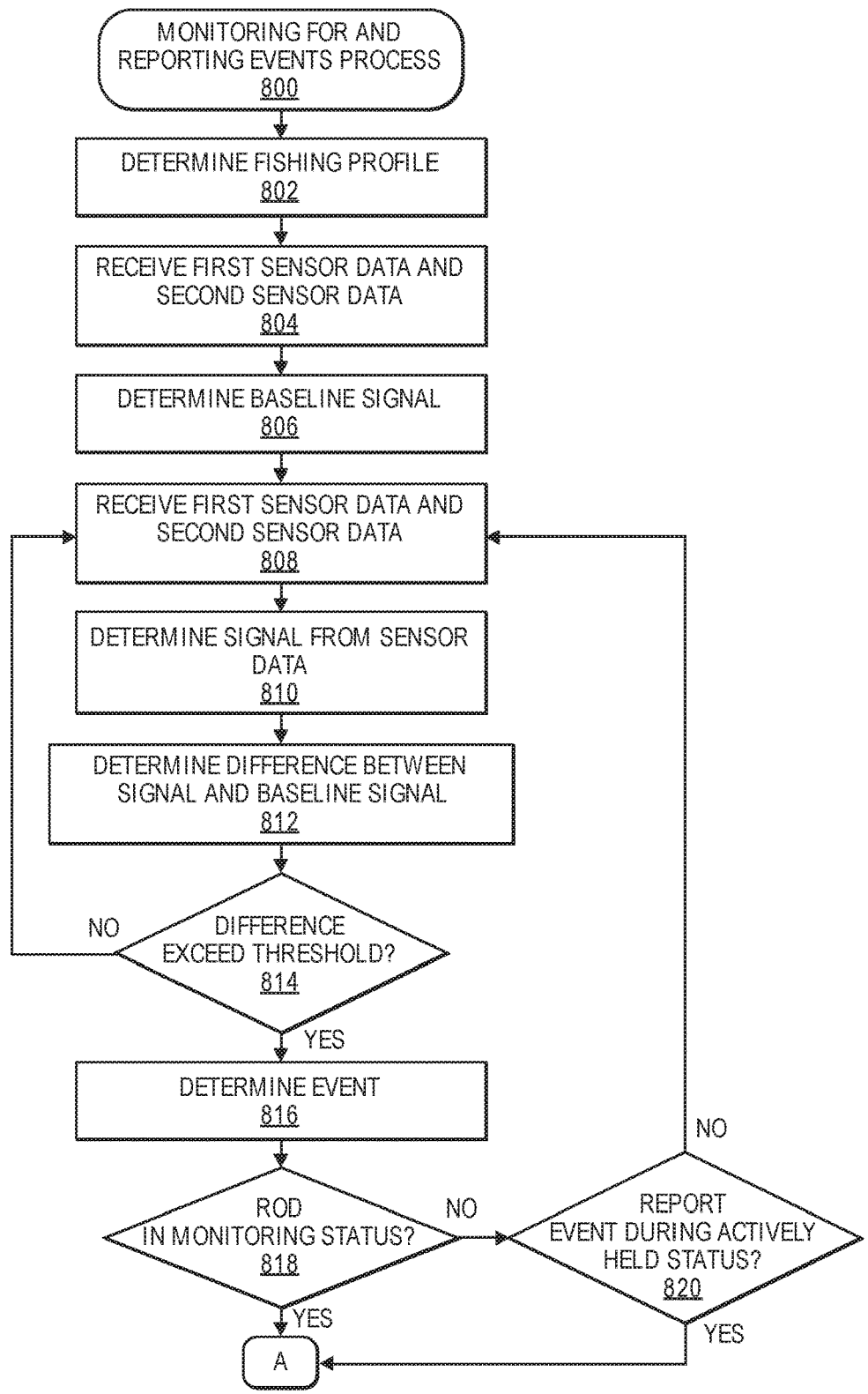
FIGS. 8A-8B is a flow diagram of an example process for monitoring for and reporting fishing related events, according to an implementation.
Figure 8B:
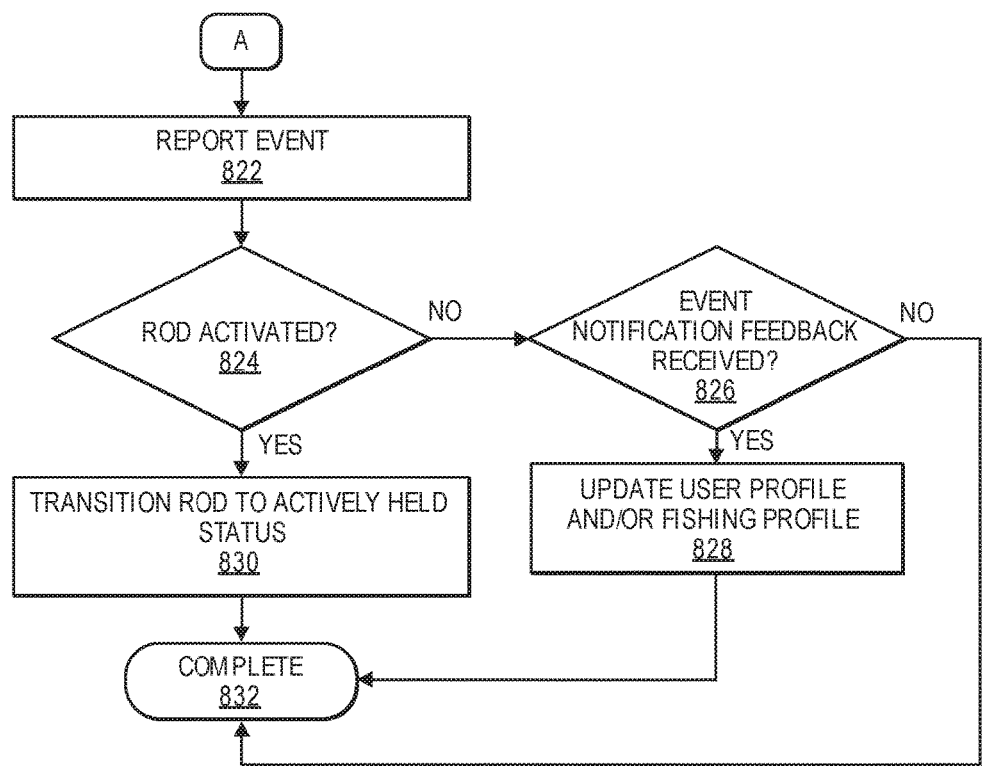

FIGS. 8A-8B is a flow diagram of an example process 800 for monitoring for and reporting fishing related events, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 800 begins by determining a fishing profile for the monitoring process, as in 802. As discussed above, different fishing activities, such as trolling, spinning, casting, etc., may have different fishing profiles. Likewise, depending on the type of fish for which the fishing monitoring system is to monitor, the fishing profiles may also vary. In one implementation, the fishing profile may be determined based off of a user input identifying the type of fishing activity and/or the fish for which they are going to be fishing. In another implementation, the fishing profile may be determined based on the location of the fishing rod, the time or season of the year, the client device, and/or other factors. In another implementation, as a user begins fishing and using the fishing related event monitoring system, the example process 800 may initially monitor the information obtained from the sensors on the fishing rod to determine the type of fishing being performed.

As the fishing rod is used for fishing, the example process may receive a first series of sensor data from the first sensor and a second series of sensor data from the second sensor, as in 804. The first series of sensor data and the second series of sensor data may be received over a defined period of time, such as 15 seconds. As the first series of sensor data and the second series of sensor data are received, the example process 800 may determine a difference between the first series of sensor data and the second series of sensor data to identify a baseline signal, as in 806. The baseline signal is representative of the flex or position of the fishing rod when no fishing event is occurring. For example, if the fishing rod is being used for trolling, when the terminal tackle is placed in the water and the fishing boat is moving, the fishing rod will flex in an amount that is detectable based off a difference between the first series of sensor data and the second series of sensor data.

Upon determination of the baseline signal, the first sensor data from a first sensor of the fishing rod and the second sensor data from a second sensor of the fishing rod is received, as in 808. As the sensor data is received from the first sensor and the second sensor, it is compared to determine a current signal, as in 810. For example, as sensor data is received from the first sensor at the tip of the fishing rod and sensor data is received from the second sensor at or near the butt of the fishing rod, the difference in the position data received from those sensors may be determined over a period of time, and those differences are representative of a signal. As the signal is determined from the differences in the first sensor data and the second sensor data, the signal is compared to the baseline signal to determine a difference between the determined signal and the baseline signal, as in 812. It may then be determined whether the difference between the determined signal and the baseline signal exceeds a threshold, as in 814. The threshold may be any defined amount and may vary for different fishing profiles, different users, different times of day, different days of year, etc. The threshold may be established by the user and/or defined and adjusted over a period of time depending on the accuracy with which events are detected.

If it is determined that the difference between the determined signal and the baseline signal does not exceed the threshold, the example process 800 returns to block 808 and continues. However, if it is determined that the difference between the determined signal and the baseline signal exceeds the threshold, an event is determined, as in 816. In some implementations, the determination of an event may be binary in that it will either be determined that an event has occurred or an event has not occurred. However, in other implementations, if it is determined that the difference between the determined signal and the baseline signal exceeds a threshold, the signal may be monitored over a period of time and the signal may be compared with stored event patterns and/or event filters indicative of determined fishing related events. Based on the comparison, the type of fishing related event that is being detected by the example process 800 may be determined.

A determination may also be made as to whether the fishing rod is in a monitoring status, as in 818. A monitoring status may be an indication that the rod is currently being used for fishing and/or is not in the hands of the user. For example, if the rod is placed in a rod holder and terminal tackle is in the water, it may be determined that the rod is in a monitoring status. In comparison, if the rod is moving at the base, as detected by a sensor located near the butt end of the flexible rod, it may be determined that the rod is not in a monitoring status. If it is determined that the fishing rod is not in a monitoring status, a determination is made as to whether the event is to be reported during the actively held status of the fishing rod, as in 820. In some implementations, all events are to be reported regardless of whether the fishing rod is in a monitoring status or an actively held status. In other implementations, only particular events are to be reported when the rod is in an actively held status. An actively held status may be any time in which a user is handling or holding the fishing rod, as detected by the example process 800.

If it is determined that the event is not to be reported, the example process 800 returns to block 808 and continues. If it is determined that the event is to be reported when the rod is in an actively held status, or if it is determined at decision block 818 that the rod is in the monitoring status, the example process proceeds to block 822, illustrated in FIG. 8B. In block 822, the event that was detected based off the signal determined from the first sensor data and the second sensor data is reported as an event notification. As discussed above, the event notification may be transmitted from the rod to a client device that then alerts a user of the event and/or the rod may alert a user to the event. For example, the rod may include an illumination element, an audible output, and/or a haptic output that is used to notify a user of the occurrence of a fishing related event by the fishing rod. In comparison, or in addition thereto, the event notification may be sent to a client device that may present a visual, audible, and/or haptic output to notify the user of the detected, fishing related event, as discussed above with respect to FIG. 7.

A determination may then be made as to whether the fishing rod has been activated, as in 824. It may be determined that a fishing rod has been activated if the fishing rod is removed from its current position, such as in a rod holder. Such a movement may be detected based off a sensor located near the butt end or handle of the fishing rod detecting a movement of the fishing rod. In another implementation, the movement may be detected by a proximity sensor located on the fishing rod.

If it is determined that the rod has not been activated, a determination is made as to whether feedback has been received from a user with regard to the notification of the event, as in 826. An event notification feedback may be provided in the form of a user selecting a confirmation that the reported event was correct, inaccurate, and/or providing an indication of an actual event that was determined by the user to have occurred. If it is determined that an event notification feedback has been received, the user profile and/or fishing profile may be updated, as in 828. Likewise, if the user is providing fishing related event feedback to others, such as via a social network, the information may be posted or updated to the user's profile and/or to a social network identified by the user. Likewise, the fishing profile maintained by the fishing management service may be updated based off the determined event, location of event, time of event, etc.

Returning to decision block 824, if it is determined that the rod has been activated, the fishing rod is transitioned from the monitoring status to an actively held status, as in 830. During an actively held status of the fishing rod, the sensor data may be collected and the signal determined to continue monitoring and tracking the occurrence of the event, determining if a different fishing related event has occurred, and/or determining additional information about the current fishing related event. For example, if a fishing related event of "fish on line" is detected and the user removed the rod from the rod holder and begins reeling in the fish, the example process 800 may continue monitoring the movement detected by the fishing rod as the fish is being reeled in by the user. Such information may be processed and compared with additional fish on line event patterns to determine a type and/or size of the fish.

In some implementations, notifications of the continued event may be suppressed and not further provided to the user as the user is already aware of the event. However, if another event is detected, such as the fish getting off the line or the line becoming snagged, the additional signal information for that event may be determined and a notification provided to the user via the output on the fishing rod and/or transmitted to a client device for output to the user. Upon determining that the rod has been transitioned to an actively held status and/or after updating the user profile or fishing profile, the example process 800 completes, as in 832.

Figure 9:
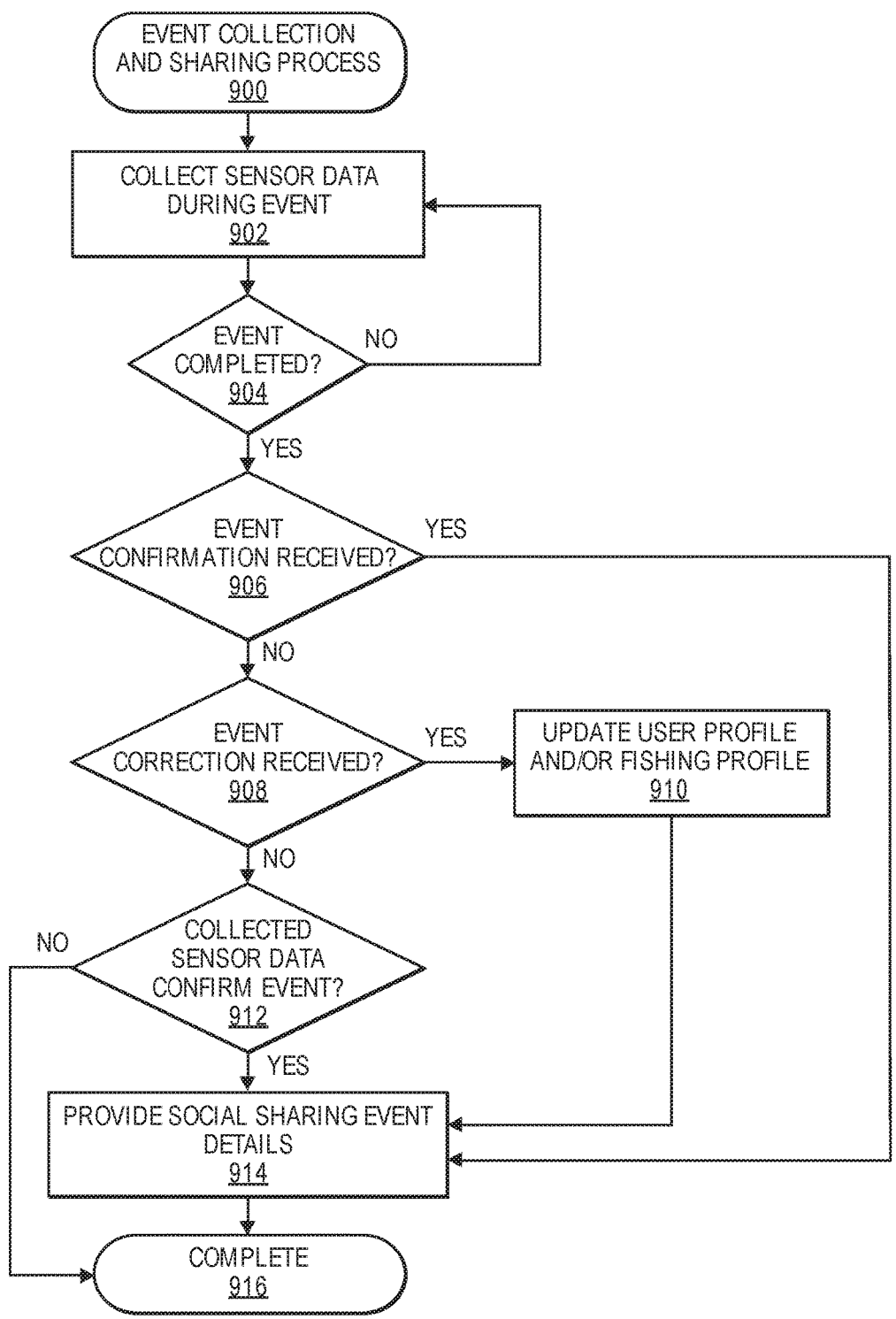
FIG. 9 is an example fishing related event collection and sharing process, according to an implementation.

FIG. 9 is an example fishing related event collection and sharing process 900, according to an implementation. The example process 900 begins by collecting sensor data during an event, as in 902. For example, as discussed above, an event may be representative of a predefined pattern indicative of the event. As the event is occurring, the example process 900 continues to collect the sensor data and compare the signal generated from the sensor data to determine if the event has completed, as in 904. If it is determined that the event has not completed, the example process 900 returns to block 902 and continues. However, if it is determined that the event has completed, a determination is made as to whether an event confirmation has been received, as in 906. An event confirmation may be provided by the user confirming the type of event for which the notification was generated. If it is determined that an event confirmation was not received, a determination is made as to whether an event correction was received, as in 908. An event correction may be provided by a user in response to receiving an event notification that does not correspond with the actual event that has occurred. In providing an event correction, the user may indicate that the notification of the event is inaccurate, may identify the actual event that occurred and/or identify that no event has occurred. If it is determined that an event correction has been received, the user profile may be updated and/or the fishing profile may be updated based on the identification of the corrected event, as in 910.

If it is determined that the event correction has not been received, a determination is made as to whether additional collected sensor data may be used to confirm the event type for which the notification was generated, as in 912. For example, if it is originally determined that the fishing related event is a "fish on line" event and the event continues to occur, the sensor data that is collected as the event continues to occur may be used to further support the position that the event of a fish on line has occurred. In comparison, if the event originally detected is a fish on line event, the rod is not activated and then the signal determined from the sensors on the fishing rod indicates that the event has stopped and the fishing rod has returned to generating a baseline signal, such information may be indicative of the original event having not occurred.

If the collected sensor data can be used to confirm the occurrence of the event, as in 912, upon receiving a correction from the user identifying a correct event that has occurred, as in block 906, or after correcting the event type based on user feedback, as in block 910, the event details may be provided via one or more social networks, as in 914. A user may specify whether they desire or not to share fishing related events via one or more social networks. If it is determined that the collected sensor data cannot confirm the event, upon providing the event details via social network, or if it is determined that the event details are not to be shared, the example process 900 completes, as in 916.

Figure 10:
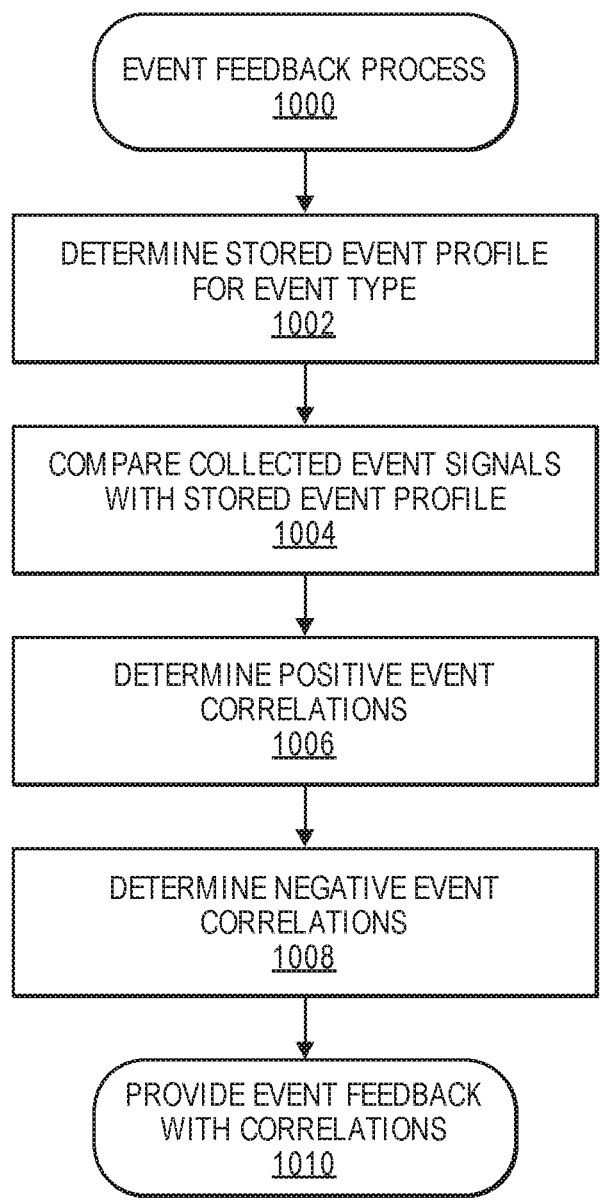
FIG. 10 is an example fishing related event feedback process, according to an implementation.

FIG. 10 is an example fishing related event feedback process 1000, according to an implementation. The example process 1000 may be used to review an event and/or as a training aid to receive feedback when practicing particular fishing related events. The example process 1000 begins by determining a stored event profile for an event type, as in 1002. As discussed above, each event may be represented in the event data store of the fishing management service as an event profile. The collected event signals for a detected fishing related event may then be compared with a stored event pattern, or the event profile, as in 1004. Based on the comparison of the collected event signals with the stored event pattern, positive event correlations may be determined, as in 1006. Positive event correlations are representative of aspects of the event that were performed properly by the user during the event. For example, if the event includes a user reeling in a fish that has been "on the line," positive event correlations may include the user keeping the tip of the fishing rod up and keeping the fishing line taut. Such positive feedback may be used to provide training to users of the system to help them improve their fishing capabilities. Likewise, if the event does not complete successfully, e.g., the fish gets off the line without being brought on board of the fishing vessel, the positive event correlations may identify that a user error did not occur that caused the fish to get away.

Similar to determining positive event correlations, one or more negative event correlations may also be determined by comparing the collected event signals with the stored event patterns of the event profile, as in 1008. Negative events may be indicative of signals generated as part of the event that do not correspond with the event profile. For example, if the line goes slack during the event of a fish being reeled in, a negative event correlation may be provided back to the user for training and/or indication as to why the event did not complete successfully. Based on the determined positive event correlations, and determined negative event correlations, event feedback with the correlations may be provided to the user, as in 1010. Such event feedback with correlations may be provided as part of a training aid to assist a user in improving their fishing skills and/or techniques. For example, the event of casting a fishing line may be monitored to identify whether the user is using a proper technique or if the user's technique can be improved to increase the distance of cast and/or accuracy of the cast. Similarly, if the event is the event type of a user reeling in a fish, the positive and negative correlations may be used to aid the user in improving their technique of keeping the fishing rod tip up and keeping the line taut so that the likelihood of the fish being able to get off the hook is decreased.

Figure 11:
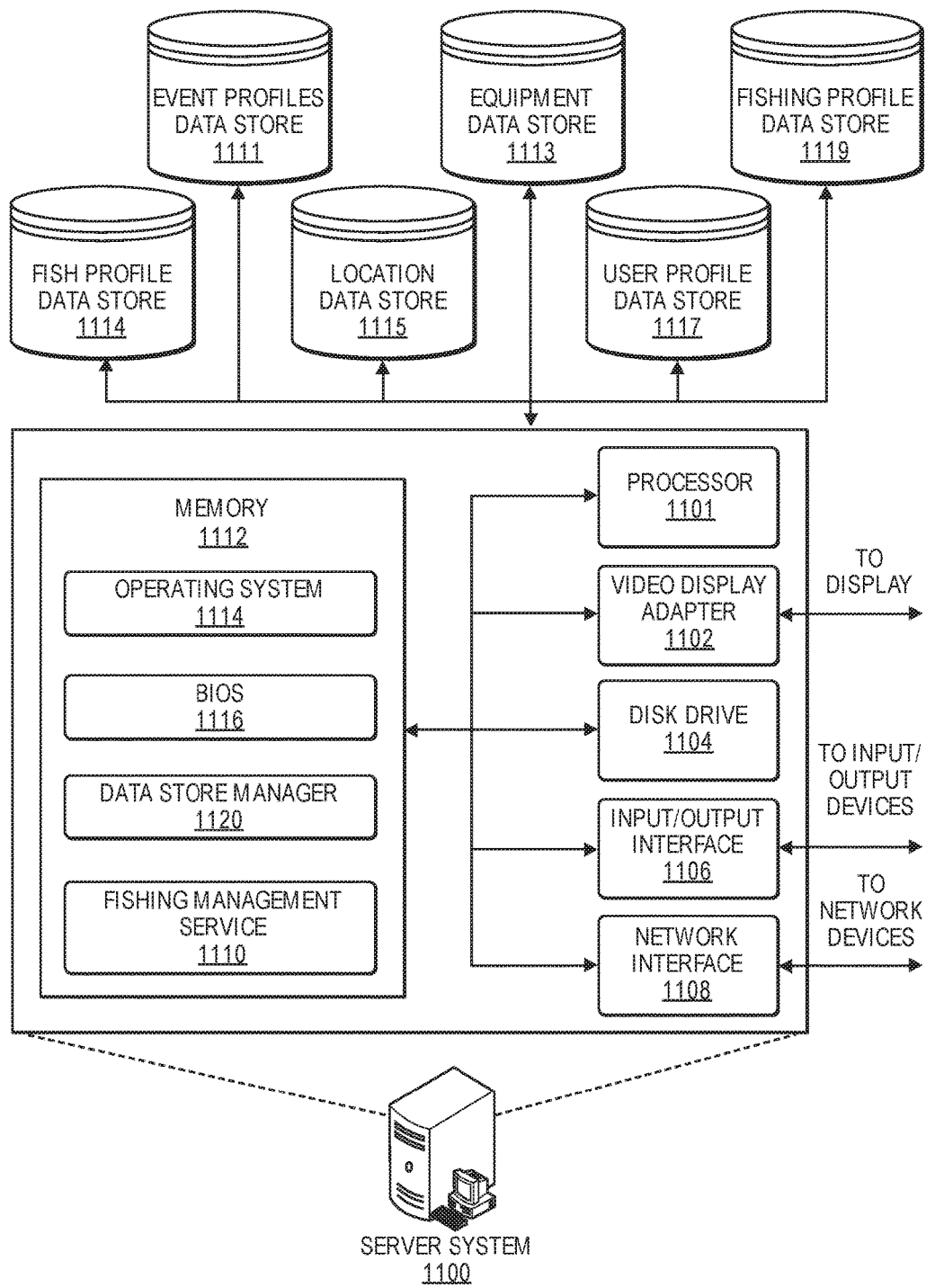
FIG. 11 is a diagram of an illustrative implementation of a server system that may be used for various implementations.

FIG. 11 is a pictorial diagram of an illustrative implementation of a server system, such as the server system 1100 that may be used in the implementations discussed herein. The server system 1100 may include a processor 1101, such as one or more redundant processors, a video display adapter 1102, a disk drive 1104, an input/output interface 1106, a network interface 1108, and a memory 1112. The processor 1101, the video display adapter 1102, the disk drive 1104, the input/output interface 1106, the network interface 1108, and the memory 1112 may be communicatively coupled to each other by a communication bus.

The video display adapter 1102 provides display signals to a local display (not shown in FIG. 11) permitting an operator of the server system 1100 to monitor and configure operation of the server system 1100. The input/output interface 1106 likewise communicates with external input/output devices not shown in FIG. 11, such as a mouse, keyboard, scanner, or other input and output devices that can be operated by an operator of the server system 1100. The network interface 1108 includes hardware, software, or any combination thereof, to communicate with other computing devices. For example, the network interface 1108 may be configured to provide communications between the server system 1100 and other computing devices, such as the fishing rod 100, client device 305, and/or supporting devices 307, via a network, such as network 308, as shown in FIG. 3.

The memory 1112 generally comprises random access memory (RAM), read-only memory (ROM), flash memory, and/or other volatile or permanent memory. The memory 1112 is shown storing an operating system 1114 for controlling the operation of the server system 1100. A binary input/output system (BIOS) 1116 for controlling the low-level operation of the server system 1100 is also stored in the memory 1112.

The memory 1112 additionally stores program code and data for providing network services that allow the fishing rod, the client device and/or the supporting devices to exchange information and data files with the server system 1100 and/or the fishing management service 1110. The program code also communicates with a data store manager application 1120 to facilitate data exchange and mapping between the event profiles data store 1111, the equipment data store 1113, the fish profile data store 1114, the location data store 1115, the user profile data store 1117, the fishing profile data store 1119, the fishing rod 100 (FIG. 1), client devices 305 (FIG. 3), and/or supporting devices 307 (FIG. 3).

As used herein, the term "data store" refers to any device or combination of devices capable of storing, accessing and retrieving data, which may include any combination and number of data servers, databases, data storage devices and data storage media, in any standard, distributed or clustered environment. The server system 1100 can include any appropriate hardware and software for integrating with the data stores 1111, 1113, 1114, 1115, 1117, 1119 as needed to execute aspects of one or more applications for the fishing rod, client device, supporting devices, and/or the fishing management service 1110. The server system 1100 provides access control services in cooperation with the data stores 1111, 1113, 1114, 1115, 1117, 1119 and is able to generate content such as fishing events, equipment profiles, fish profiles, fishing trends, text, graphics, audio, video and/or images to be transferred to a fishing rod, client device, and/or supporting device.

The data stores 1111, 1113, 1114, 1115, 1117, 1119 can include several separate data tables, databases or other data storage mechanisms and media for storing data relating to a particular aspect. For example, the data stores 1111, 1113, 1114, 1115, 1117, 1119 illustrated include mechanisms for storing images, user information, fishing related event information (history, signals), etc., which can be used to generate and deliver content to fishing rods, client devices, supporting devices, and/or to control actions to be performed (e.g., navigation, downrigger activation).

It should be understood that there can be many other aspects that may be stored in the data stores 1111, 1113, 1114, 1115, 1117, 1119, such as fishing patterns, social fishing event related information, fishing related training data, etc., which can be stored in any of the above listed mechanisms as appropriate or in additional mechanisms of any of the data stores 1111, 1113, 1114, 1115, 1117, 1119. The data stores 1111, 1113, 1114, 1115, 1117, 1119 are operable, through logic associated therewith, to receive instructions from the server system 1100 and obtain, update or otherwise process data in response thereto.

The memory 1112 may also include the fishing management service 1110, discussed above. The fishing management service 1110 may be executable by the processor 1101 to implement one or more of the functions of the server system 1100. In one implementation, the fishing management service 1110 may represent instructions embodied in one or more software programs stored in the memory 1112. In another implementation, the fishing management service 1110 can represent hardware, software instructions, or a combination thereof.

The server system 1100, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A fishing event system, comprising:
a fishing rod, including:
a flexible rod having a butt end and a tip end;
a first sensor at a first position on the fishing rod;
a second sensor at a second position on the fishing rod, wherein the second position is different than the first position; and
a first communication component for transmitting first data obtained from the first sensor and second data obtained from the second sensor;
a computing resource, separate from the fishing rod, the computing resource including:
a second communication component for communicating with the first communication component of the fishing rod and receiving the first data and the second data;
one or more processors; and
a memory coupled to the one or more processors and storing program instructions that when executed by the one or more processors causes the one or more processors to at least:
determine, based at least in part on the first data and the second data, a signal representative of a motion of the flexible rod;
determine, based at least in part on a comparison of the signal and a baseline signal that an event is occurring with respect to the fishing rod; and
generate an event notification indicating the event.

2. The fishing event system of claim 1, wherein the event is at least one of a fish on line event, a terminal tackle struck event, a bait pulled event, a terminal tackle snagged event, a line crossed event, a tangled line event, a terminal tackle bouncing bottom event, a small fish on line event, or a terminal tackle debris event.

3. The fishing event system of claim 1, wherein the program instructions further cause the one or more processors to at least:
in response to the determination of the event, update at least one profile that is maintained in a datastore accessible by the computing resource.

4. The fishing event system of claim 3, wherein the at least one profile is at least one of a user profile of a user associated with the fishing rod, a fishing profile, or an event profile associated with a type of the event.

5. A fishing apparatus, comprising:
a flexible rod;
a first sensor mounted to the flexible rod at a first position;
a second sensor mounted to the flexible rod at a second position that is different than the first position; and
a communication component in communication with the first sensor and the second sensor, the communication component configured to at least:
receive first data from the first sensor;
receive second data from a second sensor; and
transmit at least one of the first data, the second data, a signal determined based at least in part on the first data and the second data, or a notification determined based at least in part on the first data and the second data.

6. The fishing apparatus of claim 5, further comprising:
a charge coupling configured to receive power from an external source and power the fishing apparatus.

7. The fishing apparatus of claim 5, wherein:
the first sensor is at a first position toward a tip end of the flexible rod; and
the second sensor is positioned on a portion of the flexible rod that is substantially rigid such that a displacement between the first sensor and the second sensor is detectable when the tip end of the flexible rod moves with respect to a butt end of the flexible rod.

8. The fishing apparatus of claim 5, further comprising:
a third sensor positioned between the first sensor and the second sensor.

9. The fishing apparatus of claim 5, further comprising:
a notification component configured to at least:
present the notification determined based at least in part on the first data and the second data; or
present a second notification in response to a communication received by the communication component indicating an occurrence of an event.

10. A computer implemented method for detecting a fishing related event, comprising:
receiving, over a period of time, first sensor data from a first sensor at a first sensor position on a fishing rod;
receiving, over the period of time, second sensor data from a second sensor at a second sensor position on the fishing rod;
determining, based at least in part on the first sensor data and the second sensor data, a first signal representative of a relative motion of the fishing rod;
determining that the first signal is representative of an event having an event type; and
reporting at least one of the event or the event type.

11. The computer implemented method of claim 10, wherein reporting includes:
providing information representative of the event to a social network.

12. The computer implemented method of claim 10, further comprising:
receiving, in response to the reporting, an event confirmation confirming an accuracy of the event; and
updating an event profile corresponding to the event or the event type.

13. The computer implemented method of claim 10, further comprising:
receiving from at least a second fishing rod at least one of a second event notification or a second signal; and
confirming the event type based at least in part on the second event notification or the second signal.

14. The computer implemented method of claim 10, further comprising:
storing, in a data store, event information determined based at least in part on the first sensor data and the second sensor data.

15. The computer implemented method of claim 14, further comprising:
aggregating the event information with other event information to determine at least one of a trouble area for fishing, a preferred trolling speed when trolling for fish, a preferred type of terminal tackle, a location, a trolling speed, an area where fish are known to be located or caught, a temperature, or a season.

16. The computer implemented method of claim 14, further comprising:
updating a user profile maintained in a fishing profile data store that is accessible by a plurality of users.

17. The computer implemented method of claim 10, further comprising:
receiving, at a supporting device, the reporting; and
performing at least one action in response to receiving the reporting.

18. The computer implemented method of claim 17, wherein the supporting device is at least one of:
a downrigger, a navigation system, a reel, a motor, a rod holder, a depth/fish finder, a terminal tackle, a second fishing rod, or a client device.

19. The computer implemented method of claim 17, wherein the action is at least one of:
retracting a downrigger weight, altering a navigation of a vessel, or retracting a fishing line.

20. The computer implemented method of claim 17, wherein the action is at least one of:
receiving, over the period of time, third sensor data from a third sensor; and
wherein the first signal is further determined based at least in part on the third sensor data.

* * * * *